(12) United States Patent
Robinson (10) Patent No.: US 6,585,453 B2
(45) Date of Patent: Jul. 1, 2003

(54) APPARATUS FOR TRENCHLESS UNDERGROUND PIPE REPLACEMENT

(76) Inventor: Gerald M. Robinson, 5708 Ewart St., Burnaby, British Columbia, V5J 2W7 (CA)

( * ) Notice: Subject to any disclaimer, the term of this patent is extended or adjusted under 35 U.S.C. 154(b) by 0 days.

(21) Appl. No.: 09/907,580

(22) Filed: Jul. 19, 2001

(65) Prior Publication Data

US 2003/0017008 A1 Jan. 23, 2003

(51) Int. Cl.$^7$ ................................................. F16L 55/44
(52) U.S. Cl. ................................ 405/184.3; 405/184.1; 405/184; 405/174; 175/53; 175/19
(58) Field of Search ................................ 405/174, 184, 405/184.1, 184.3; 175/53, 19

(56) References Cited

U.S. PATENT DOCUMENTS

| | | | |
|---|---|---|---|
| 1,519,882 A | | 12/1924 | Stewart et al. |
| 1,618,368 A | | 2/1927 | Dietle |
| 2,502,711 A | | 4/1950 | Evans |
| 2,638,165 A | | 5/1953 | Barber |
| 2,670,180 A | * | 2/1954 | Ranney ........................ 166/100 |
| 4,505,302 A | | 3/1985 | Streatfield et al. |
| 4,626,134 A | | 12/1986 | Coumont |
| 4,637,756 A | | 1/1987 | Boles |
| 4,657,436 A | * | 4/1987 | Yarnell ........................ 138/97 |
| 4,720,211 A | | 1/1988 | Streatfield et al. |
| 4,738,565 A | | 4/1988 | Streatfield et al. |
| 4,789,268 A | * | 12/1988 | Yarnell ........................ 166/361 |
| 4,830,539 A | | 5/1989 | Akesaka |
| 4,848,964 A | * | 7/1989 | Yarnell ........................ 405/156 |
| 5,013,188 A | | 5/1991 | Campbell et al. |
| 5,094,496 A | | 3/1992 | King, Sr. |
| 5,096,000 A | * | 3/1992 | Hesse ........................ 175/171 |
| 5,098,225 A | | 3/1992 | Rockower et al. |
| 5,111,891 A | * | 5/1992 | Kinnan ........................ 175/21 |
| 5,211,509 A | | 5/1993 | Roessler |
| 5,302,053 A | * | 4/1994 | Moriarty ........................ 166/55.2 |

(List continued on next page.)

FOREIGN PATENT DOCUMENTS

DE  3813767 C1 * 6/1989  ............. E03F/3/06

OTHER PUBLICATIONS

O'Brien & Gere Companies, OBG Trenchless Technologies, www.obg.com/infocenter/whitepapers/whitepaper_trenchless.asp, © 2001, 12 pages www.obg.com/infocenter/whitepapers/whitepaper_sewer_trench.asp, © 2001, 5 pages, teach trenchless pipelaying technologie.*

Primary Examiner—James R. Brittain
Assistant Examiner—Katherine Mitchell
(74) Attorney, Agent, or Firm—Hall, Priddy, Myers & Vande Sande (57) ABSTRACT

An apparatus for replacing underground pipe. The apparatus has a fracturing or cutting element to fracture or cut underground pipe as it is drawn through the underground pipe. The apparatus additionally has an expanding element to expand the cavity of the underground pipe and a pipe guide to guide replacement pipe into the cavity of the underground pipe. The apparatus incorporates a longitudinal bore running the length thereof. A pulling line is passed through the longitudinal bore and connected to a block. The pulling line and block are operative to draw the apparatus through the underground pipe. A retaining line is connected to the block and trails the apparatus through the underground pipe. The retaining line permits retrieval of the apparatus in the event of an obstruction of the underground pipe. In addition, a plate connected to the retaining line is used to push replacement pipe into the cavity of the underground pipe behind the apparatus. The apparatus is composed of a plurality of independent sections, which are easily disconnected from one another.

13 Claims, 6 Drawing Sheets

U.S. PATENT DOCUMENTS

| | | | |
|---|---|---|---|
| 5,544,977 A | * | 8/1996 | Cravy et al. .................. 166/55 |
| 5,597,192 A | | 1/1997 | Smith |
| 5,642,912 A | | 7/1997 | Parish, II |
| 5,647,627 A | | 7/1997 | Baessler |
| 5,709,503 A | * | 1/1998 | Manlow ....................... 138/97 |
| 5,876,152 A | * | 3/1999 | Hesse .......................... 175/22 |
| 5,988,719 A | | 11/1999 | Lavender |
| 5,997,215 A | | 12/1999 | Schwert |
| 6,092,553 A | | 7/2000 | Hodgson |
| 6,109,832 A | * | 8/2000 | Lincoln ....................... 175/53 |
| 6,149,349 A | | 11/2000 | Nikiforuk et al. |
| 6,171,026 B1 | | 1/2001 | Crane et al. |
| 6,443,658 B1 | * | 9/2002 | Lincoln ................... 405/184.1 |
| 2001/0018007 A1 | * | 8/2001 | Puttmann ................. 405/184.3 |

* cited by examiner

APPARATUS FOR TRENCHLESS UNDERGROUND PIPE REPLACEMENT

FIELD

The present invention relates to an apparatus for the replacement of underground pipe.

BACKGROUND

Underground pipes are subject to inevitable deterioration and wear and, therefore, must be replaced from time to time. An obvious method for replacing existing underground pipe with replacement pipe is to excavate the entire length of the existing pipe, remove it and place new replacement pipe into the excavation. Excavation of existing pipe is time-consuming, labor-intensive and results in damage to the area surrounding the excavation. In many instances pipes often lie beneath driveways, buildings, or gardens, and property owners are very concerned about any damage that may result thereto. In addition, excavation is often made difficult by the presence of underground utilities.

Accordingly, it is an object of the present invention to provide an apparatus and method for replacing underground pipe requiring minimal excavation.

Other devices and methods have previously been proposed for use in replacement of underground pipes and mains. For example, those disclosed in U.S. Pat. No. 6,171,026 issued to Crane et al.; U.S. Pat. No. 6,092,553 issued to Hodgson; U.S. Pat. No. 5,544,977 issued to Crane et al.; U.S. Pat. Nos. 4,720,211; and 4,738,565 issued to Streatfield et al. However, all of the devices and methods disclosed by the above patents suffer from several drawbacks.

The devices and methods disclosed by the prior are drawn through an existing pipe by a cable, chain or similar pulling means. Due to the forces involved in the operation of such devices the pulling means may break from time to time, thereby leaving the device lodged in the ground. Similarly, the device may become lodged if it encounters an obstruction which prevents it for being advanced. In such situations the existing underground pipe is blocked and damaged and the only remedy is to retrieve the device by excavation. Such excavation results in significant additional expenditures of time and money and nullifies the advantages of trenchless pipe replacement. In many instances, excavation is not an acceptable alternative to the customer. Accordingly, it is an object of the present invention to provide an improved device for trenchless underground pipe replacement, which is easily retrieved without further excavation.

In addition, the use of the devices and methods disclosed by the prior art blocks the existing underground pipe such that fluids carried by the pipe cannot pass. Accordingly, it is an object of the present invention to provide a device for the trenchless replacement of underground pipe that permits the passage of fluids through the existing underground pipe as the device is drawn through the existing underground pipe.

The prior art additionally discloses devices and methods for drawing sections of new pipe into the cavity of the existing underground pipe. Due to the forces involved in drawing new sections of pipe through such a cavity only certain types of replacement pipe can be used. The type of replacement pipe is limited by the strength of the joints between adjoining sections of replacement pipe. Such joints must be strong enough to draw a plurality of sections of replacement pipe through the cavity of the existing underground pipe. Accordingly, it is an objective of the present invention to provide a device for the trenchless replacement of underground pipe that permits existing underground pipe to be replaced with a wide variety of replacement pipes.

The devices and methods for the trenchless replacement of underground pipe disclosed by the prior art involve the use of relatively long and rigid tools, which cannot follow turns or bends of the existing underground pipe. Accordingly, it is a further objective of the present invention to provide a device for the trenchless replacement of underground pipe which can pass through a bend or turn of an existing underground pipe of up to 45° or more.

Some of the devices disclosed by the prior art, for example that described by U.S. Pat. No. 4,720,211, issued to Streatfield et al., are designed to fracture the existing underground pipe to make way for new pipe. However, when subjected to such devices some types of polymeric pipes tend to stretch or expand and are therefore not fracturable. Such polymeric pipes must be cut in order to make way for new pipe. Accordingly, it is an object of the present invention to provide a device that cuts existing underground pipe.

SUMMARY OF THE INVENTION

An apparatus and method are provided for the trenchless replacement of underground pipes, wherein a tool is drawn through an existing underground pipe. The tool includes several subsections; a first subsection cuts or fractures the existing underground pipe as it is drawn through the existing underground pipe, a second subsection causes some outward movement of the fragments of the existing underground pipe and causes a widening of the cavity of the existing underground pipe, and a third subsection guides replacement pipe into the cavity of the existing underground pipe. The subsections are engageable with one another to the tool. The first subsection is engaged with the second subsection and the second subsection is engaged with the third subsection. Each of the subsections has a longitudinal bore extending therethrough such that when the subsections are engaged the tool has a longitudinal bore extending from the front end of the first subsection to the rear end of the third subsection. The tool additionally comprises a block, which is engageable with the bore. A first line for pulling the tool forward is passed through the bore and connected to the block. A second line for retrieving the block is also connected to the block.

The pulling line is connected to any of a variety of devices capable of generating sufficient force to draw the pulling line, the tool and sections of replacement pipe through the existing underground pipe. For example the pulling line may be connected to a hydraulic cylinder supported on a frame. The action of the hydraulic cylinder draws the pulling line, tool and sections of replacement pipe into the existing underground pipe.

In one aspect of the present invention the tool is divided into subsections. The subsections of the tool may be functionally distinct, such that one subsection cuts or fractures the existing underground pipe, another widens the cavity, and another draws replacement pipe into place.

Alternatively, subsections of the tool may combine more than one functional element, for example one subsection of the tool may both fracture the existing underground pipe and widen the cavity. The subsections of the tool are capable of movement relative to one another as the tool is drawn through the existing underground pipe. Such movement allows the tool to articulate or bend as it is drawn through an existing underground pipe. This aspect of the invention allows the tool to be drawn through curves or changes in direction of the existing underground pipe.

In another aspect of the present invention the tool has a longitudinal bore. The bore is sufficiently wide to allow the passage of a pulling line, or other pulling means, capable of drawing the tool through the existing underground pipe. The pulling line is passed through the existing underground pipe, through the bore of the tool and is connected to a large block. The large block is of a size and shape such that it cannot pass through the bore. Therefore when tension is applied to the pulling line, the large block is forced against the bore and the tool is forced through the existing underground pipe, thereby fracturing or cutting it, expanding the cavity and moving replacement pipe into the cavity.

The bore imparts several advantages to the tool over the prior art. The bore results in a lighter tool that is therefore easier to handle. In addition, the bore allows fluids carried by the existing underground pipe to pass through the tool while it is in use.

Devices for the replacement of underground pipe that are drawn through existing underground pipe from time to time encounter obstructions. In the event of such an obstruction, the bore of the tool of the present invention allows the tool to be retrieved from the existing underground pipe without additional excavation. By pulling on the retaining line, the large block and pulling line may be withdrawn from the underground pipe while leaving the tool and replacement pipe in situ. The large block may then be disconnected from the pulling line. The large block and retaining line are then moved to an excavation ahead of the obstruction and tool from which the pulling line and tool were initially drawn through the existing underground pipe. There the large block is reconnected to the pulling line and drawn through the existing underground pipe in the other direction. When the large block meets the tool, the tool and replacement pipe are forced back through the cavity of the existing underground pipe so that they may be retrieved. The tool and replacement pipe may then be drawn through the existing underground pipe in the other direction.

In the event that the pulling line breaks during the operation of the tool, the tool and replacement pipe become lodged in the cavity of the existing underground pipe. However, the pulling line, retaining line and large block may then be withdrawn from the cavity of the existing underground pipe. Any of several methods may be used to feed a line through the existing pipe, tool and replacement pipe. For example a wire may be inserted from one end until it exits the other end. The wire is then used to draw the retaining line through the existing underground pipe, which in turn is used to draw a new pulling line and large block into the existing underground pipe. The tool and replacement pipe may then drawn through the existing underground pipe again or may be removed by forcing them back through the cavity of the existing underground pipe.

In another aspect of the invention, the tool is divided into subsections, which are easily separated from one another. This aspect, in conjunction with the bore of the tool, confers a further advantage over the prior art. When the tool encounters an obstruction, the retaining line, large block and pulling line may be withdrawn and the large block replaced with a small block. The small block is of a size and shape such that it can pass through the bore of the hindmost subsection(s) of the tool but cannot pass through the bore of the foremost subsection of the tool. The foremost subsection of the tool comprises a cutting or fracturing element and/or an expanding element of the tool. The pulling line, small block and retaining line are drawn into the cavity of the existing underground pipe until the small block contacts the bore of the foremost subsection of the tool. The small block then forces the foremost subsection of the tool through the existing underground pipe in order to clear the obstruction, fracture or cut the existing underground, and/or expand the cavity of the existing underground pipe. The pulling line, small block and retaining line can then be drawn back through the cavity of the existing underground pipe. The small block is disconnected from the pulling and retaining lines and the large block reconnected thereto. The pulling line, large block and retaining line are then drawn through the cavity of the existing underground pipe until the large block contacts the hindmost subsection of the of the tool. The obstruction having been cleared, the tool is forced through the cavity of the existing underground pipe, expanding it and moving replacement pipe into place.

In another aspect of the invention the replacement pipe is pushed into the cavity of the existing underground pipe. The hindmost subsection of the tool is a pipe guide that receives the first section of replacement pipe and guides the replacement pipe as the tool advances along the existing underground pipe. The retaining line passes from the tool through the sections of replacement pipe and exits the replacement pipe at the point where the new sections of replacement pipe are connected to those sections already in the cavity of the existing underground pipe. At the point where the retaining line exits the replacement pipe a plate is attached to the retaining line. As the pulling line is drawn through the existing underground pipe the tool and retaining line are drawn by the pulling line. The plate attached to the retaining line forces the sections of replacement pipe ahead as the retaining line advances through the existing underground pipe. In this manner the replacement pipe is pushed into the cavity of the existing underground pipe. The plate is removed periodically to connect an additional section of replacement pipe to those sections already in the cavity of the existing underground pipe. The plate is then reattached to the retaining line to force the replacement pipe into the cavity of the existing underground pipe. It is obvious to anyone skilled in the art that any of a variety of devices may be used in place of a plate to push the replacement pipe. An advantage of pushing the replacement pipe into place is that one need not wait for the bond between adjacent sections of replacement pipe to set before advancing the tool and replacement pipe through the existing underground pipe.

A further advantage of pushing replacement pipe into place is that less stress is placed on the joints between adjacent sections of replacement pipe than if the replacement pipe is pulled into place. Since bonds between adjacent sections of different types of replacement pipe vary in strength and set time, pushing the replacement pipe means that a wider variety of replacement pipes may be used.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
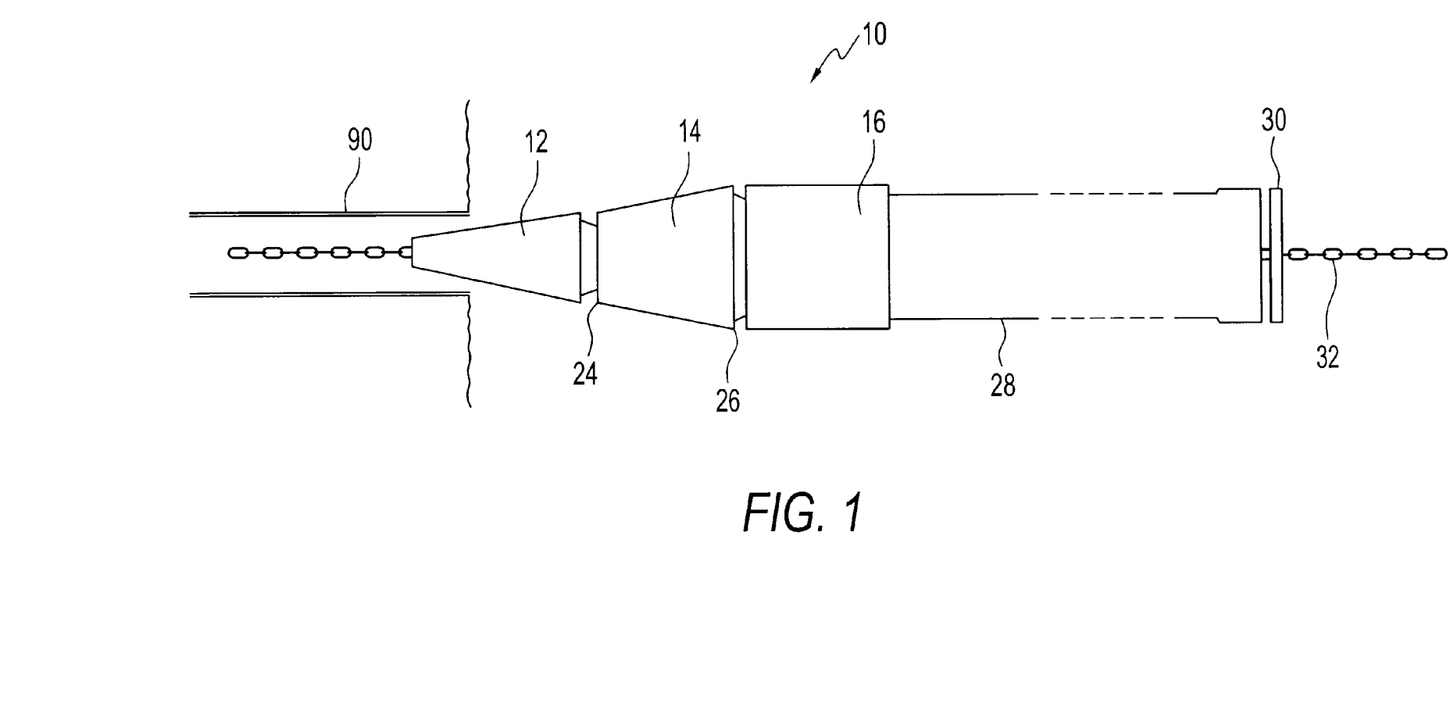
FIG. 1 is a side view of a cutting head, expanding head and pipe guide with a section of replacement pipe attached being drawn into an underground pipe.

Referring to FIG. 1, a tool 10 is shown made up of a breaking head 12, expanding head 14 and pipe guide 16. In the embodiment shown in FIG. 1 the breaking head 12 is operative to fracture the underground pipe 90 by forcing the walls thereof outwards. The expanding head 14 has a generally tapered shape with the diameter at the forward end 24 being less than the inside diameter of the existing underground pipe 90. The rearward end 26 of the expanding head 14 has a diameter at least as large as the outside diameter of the existing underground pipe 90. Pipe guide 16 receives a first section of replacement pipe 28. When tool 10 is in operation, the first section of replacement pipe 28 is pushed behind tool 10 by plate 30, which is removably attached to retaining line 32. The tool 10 is drawn through an existing underground pipe 90 by pulling line 34.

Figure 2:
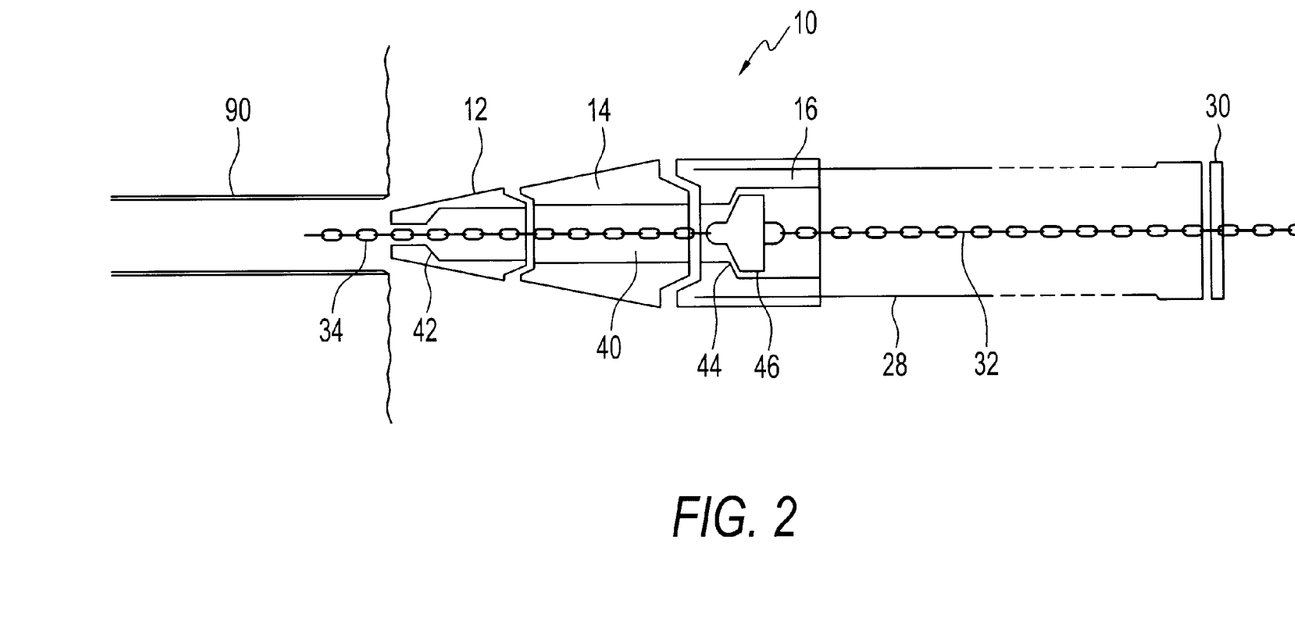
FIG. 2 is a cutaway side view of a cutting head, expanding head and pipe guide with a section of replacement pipe attached.

Referring to FIG. 2 a cutaway view of tool 10, including breaking head 12, expanding head 14 and pipe guide 16 is shown. A longitudinal bore 40 runs the length of the tool 10. In breaking head 12, longitudinal bore 40 has an angled face 42 at a point where the longitudinal bore 40 narrows. Similarly, in pipe guide 16 the longitudinal bore 40 has an angled face 44 at a point where the longitudinal bore narrows. Large block 46 is connected to pulling line 34 and retaining line 32. Large block 46 is shown in contact with angled face 44 of longitudinal bore 40. As tension is applied to pulling line 34, large block 46 is forced against angled face 44 thereby forcing tool 10 through an existing underground pipe 90. Plate 30 is removably connected to retaining line 32. When tension is applied to pulling line 34, plate 30 forces the first section of replacement pipe 28 into a cavity of an existing underground pipe 90 behind tool 10.

Figure 3A:
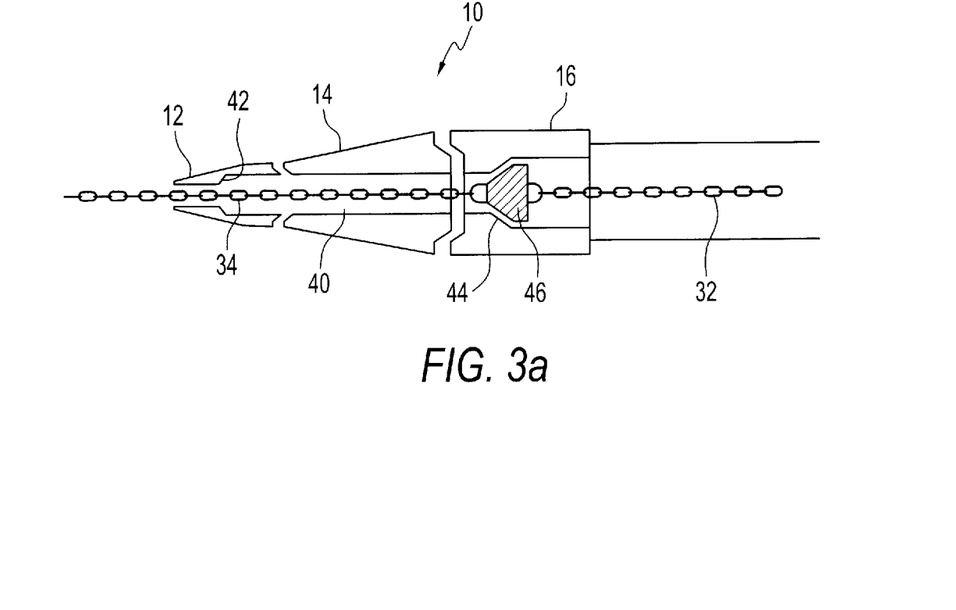
FIGS. 3a and 3b are cutaway side views of the tool showing the cutting head advancing independently of the expanding head and pipe guide.
Figure 3B:
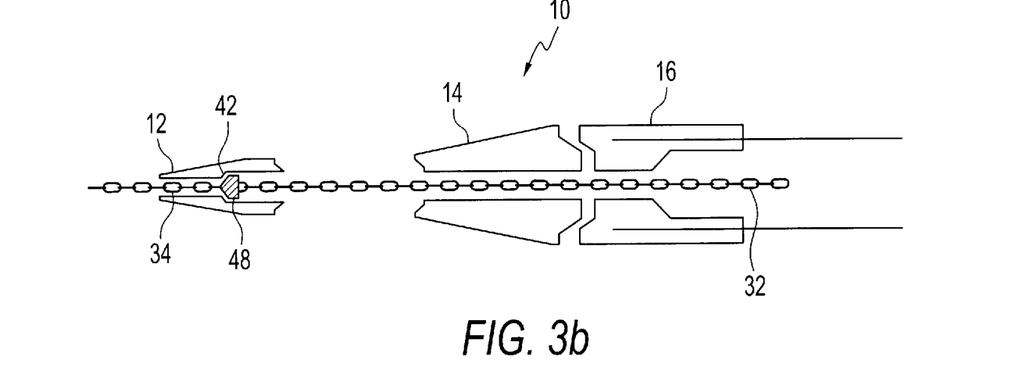

Referring to FIGS. 3a and 3b, a cutaway view of tool 10, including breaking head 12, expanding head 14 and pipe guide 16, is shown. Tool 10 has a longitudinal bore 40 with angled face 44. When tension is applied to pulling line 34, large block 46 is forced against angled face 44 so as to advance tool 10 through an existing underground pipe. In the event that tool 10 encounters an obstruction in an existing underground pipe, large block 46 may be withdrawn by applying tension to pulling line 32. Large block 46 may then be replaced with small block 48. As tension is applied to pulling line 34, small block 48 is drawn through tool 10 until it meets angled face 42, thereby forcing breaking head 12 through an existing underground pipe independently of expanding head 14 and pipe guide 16.

Figure 4A:
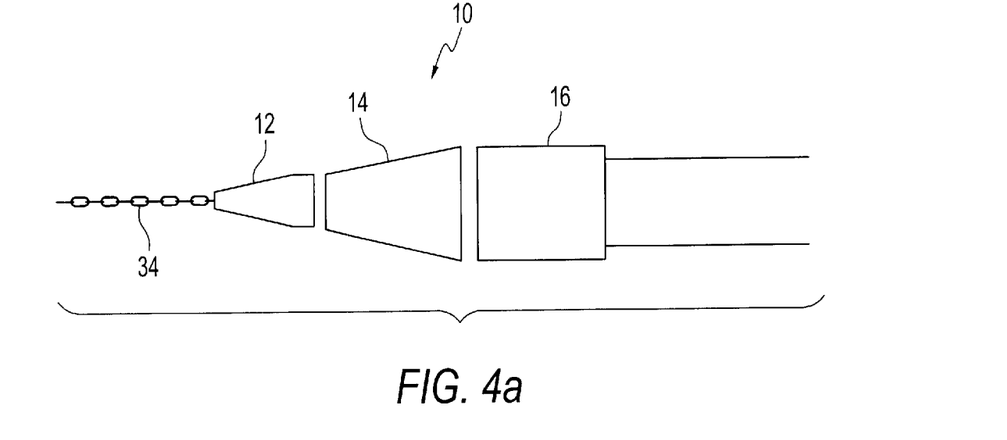
FIGS. 4a and 4b are side views of the tool showing the tool passing through a curve in the existing underground pipe.
Figure 4B:
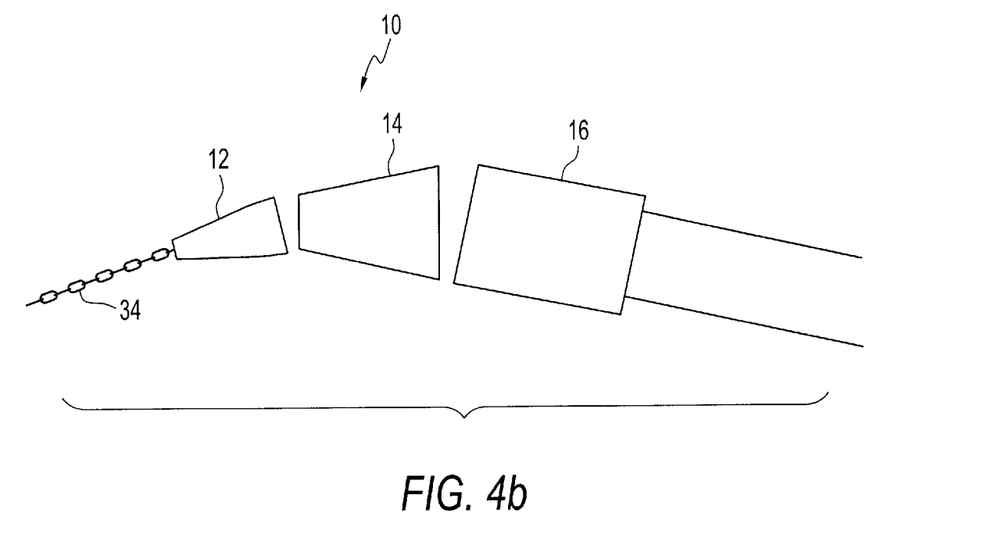

Referring to FIGS. 4a and 4b, a side view of the tool 10 is shown. Tool 10 includes breaking head 12, expanding head 14 and pipe guide 16, all of which are capable of movement relative to one another. In the event that there is a curve or change in direction of an existing underground pipe the tool 10 is able to bend in order to follow the curve or change in direction.

Figure 5A:
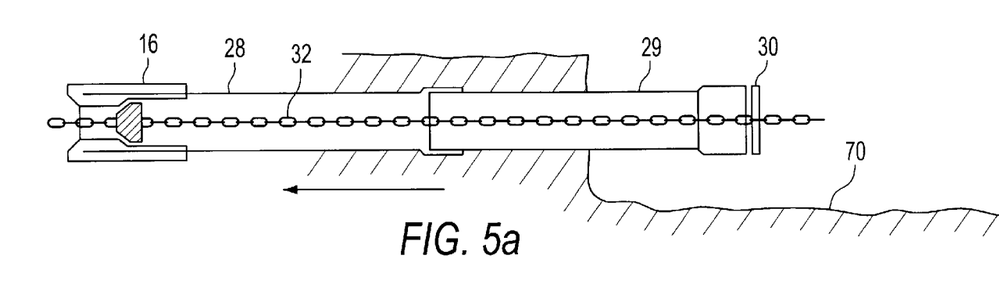
FIGS. 5a, 5b and 5c are cutaway side views showing the advancement of sections of replacement pipe.

Referring to FIG. 5a, the pipe guide 16, first section of replacement pipe 28 and second section of replacement pipe 29 are shown being advanced through a cavity of an existing underground pipe. The pipe guide 16 and sections of replacement pipe 28, 29 are preceded by a breaking head and expanding head which are not shown (see FIG. 1). A plate 30 removably connected to retaining line 32 pushes the sections of replacement pipe 28, 29 into a cavity of an existing underground pipe behind pipe guide 16. The second section of replacement pipe 29, retaining line 32 and plate 30 protrude into an excavation 70.

Figure 5B:
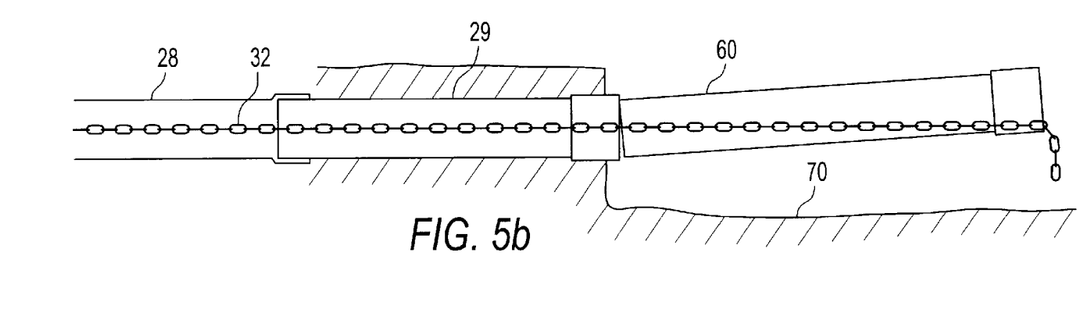

Referring to FIGS. 5a and 5b, when the end of the second section of replacement pipe 29 nears the wall of the excavation 70, the plate 30 is removed from retaining line 32 and a third section of replacement pipe 60 is connected to the second section of replacement pipe 29.

Figure 5C:
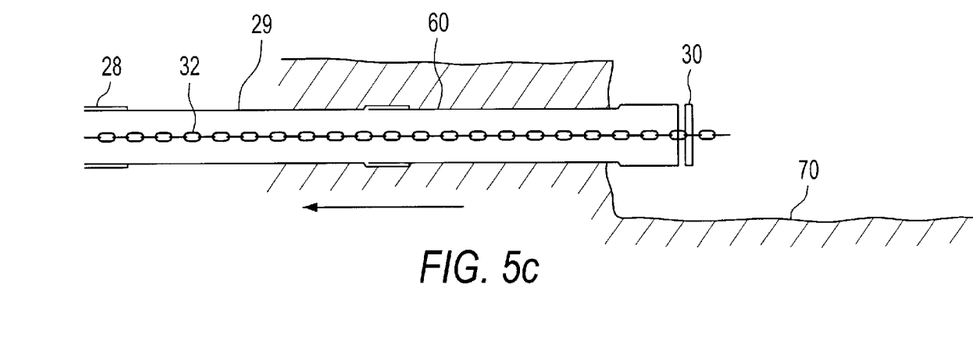

Referring to FIG. 5c, plate 30 is reconnected to retaining line 32 and sections of replacement pipe 28, 29 and 60 are advanced into the cavity of existing underground pipe. The process of FIGS. 5a, 5b and 5c is repeated until all of the existing underground pipe has been replaced with sections of replacement pipe.

Figure 6:
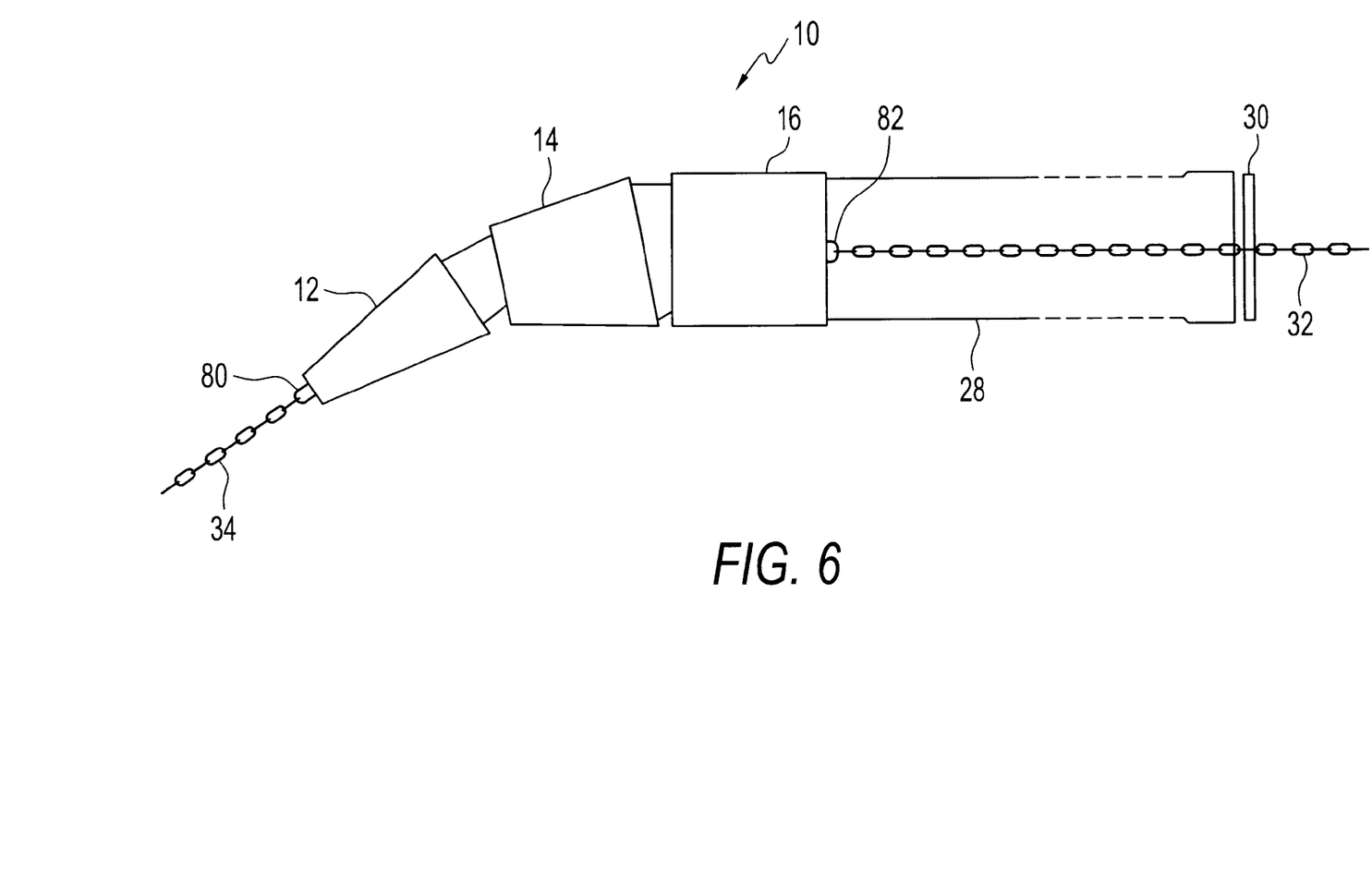
FIG. 6 is a side view of an alternate embodiment of the tool with the replacement pipe in a cutaway view to show the connection of the retaining line to the tool.

Referring to FIG. 6, an alternative embodiment of the tool 10 is shown. The tool 10 includes breaking head 12, expanding head 14 and pipe guide 16. Breaking head 12, expanding head 14, and pipe guide 16 are all capable of movement relative to one another and tool 10 is shown in a articulated configuration as if the tool 10 were passing through a bend in an underground pipe. In the alternative embodiment the tool 10 does not have a longitudinal bore. Pulling line 34 is connected to tool 10 by connection means 80. Replacement pipe 28 is shown in cutaway in order to demonstrate that retaining line 32 is connected to tool 10 by connection means 82.

I claim:

1. A tool for the replacement of underground pipe comprising:
   a) a first subsection for cutting or fracturing said underground pipe into fragments,.said first subsection having a front end and a rear end;
   b) a second subsection for causing outward movement of said fragments and for widening a cavity of said underground pipe, said second subsection having a front end and a rear end, said front end of said second subsection being engageable with said rear end of said first subsection;
   c) a third subsection for guiding replacement pipe into said cavity, said third subsection having a front end and a rear end, said front end of said third subsection being engageable with said rear end of said second subsection, said rear end of said third subsection operative to receive a first section of said replacement pipe;
   d) a longitudinal bore extending through each of said subsections such that when said subsections are engaged with one another said tool has a longitudinal bore extending from said front end of said first subsection to said rear end of said third subsection;
   e) a block engageable with the bore of said tool;
   f) a first line removably connectable to said block, said first line operative to pull said block forward such that said tool can be drawn through said underground pipe; and
   g) a second line removably connectable to said block such that said second line trails said tool, said second line operative to pull said block and said pulling line rearwardly such that said block may be retrieved from said underground pipe.

2. The tool according to claim 1, wherein said block is engageable with a portion of the bore in said first subsection, such that said first subsection can be drawn through said underground pipe independently of said second and third subsections.

3. The tool according to claim 1, wherein said block is engageable with a portion of the bore in said second subsection, such that said first and second subsections can be drawn through said underground pipe independently of said third subsection.

4. The tool according to claim 1, wherein said first, second and third subsections are capable of movement relative to one another such that said tool can bend or articulate.

5. The tool according to claim 1, wherein said tool further includes a plate, said plate being removably connectable to said second line at selected positions thereupon.

6. The tool according to claim 5, wherein said plate is connectable to said second line directly behind said replacement pipe, said plate and said second line operative to push said replacement pipe into said cavity of said underground pipe behind said tool.

7. The tool according to claim 1, wherein said rear end of said third subsection slidably receives a first section of said replacement pipe.

8. A tool for the replacement of underground pipe comprising:
    a) a first subsection for cutting or fracturing said underground pipe into fragments, and for causing some outward movement of said fragments and widening a cavity of said underground pipe, said first subsection having a front end and a rear end;
    b) a second subsection for causing outward movement of said fragments, widening a cavity of said underground pipe, and guiding replacement pipe into said cavity, said second subsection having a front end and a rear end, said front end of said second subsection being engageable with said rear end of said first subsection, said rear end of said second subsection operative to receive a first section of said replacement pipe;
    c) a longitudinal bore extending through said first and second subsections such that when said first and second subsections are engaged with one another said tool has a longitudinal bore extending from said front end of said first subsection to said rear end of said second subsection;
    d) a block engageable with the bore of said tool;
    e) a first line removably connectable to said block, said first line operative to pull said block forward such that said tool can be drawn through said underground pipe; and
    f) a second line removably connectable to said block such that said second line trails said tool, said second line operative to pull said block and said pulling line rearwardly such that said block may be retrieved from said underground pipe.

9. The tool according to claim 8, wherein said block is engageable with a portion of the bore in said first subsection, such that said first subsection can be drawn through said underground pipe independently of said second subsection.

10. The tool according to claim 8, wherein said first and second subsections are capable of movement relative to one another such that said tool can bend or articulate.

11. The tool according to claim 8, wherein said tool further includes a plate, said plate being removably connectable to said second line at selected positions thereupon.

12. The tool according to claim 11, wherein said plate is connectable to said second line directly behind said replacement pipe, said plate and said second line operative to push said replacement pipe into said cavity of said underground pipe behind said tool.

13. The tool according to claim 8, wherein said rear end of said second subsection slidably receives a first section of said replacement pipe.

* * * * *